US009904408B2

(12) United States Patent
Araki et al.

(10) Patent No.: US 9,904,408 B2
(45) Date of Patent: Feb. 27, 2018

(54) ELECTRONIC DEVICE THAT PRESENTS TACTILE FEELING TO AN OPERATION OF A USER

(71) Applicant: Panasonic Intellectual Property Management Co., Ltd., Osaka (JP)

(72) Inventors: Shoichi Araki, Osaka (JP); Yoshifumi Hirose, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 15/047,060

(22) Filed: Feb. 18, 2016

(65) Prior Publication Data
US 2016/0162113 A1 Jun. 9, 2016

Related U.S. Application Data

(63) Continuation of application No. PCT/JP2015/000583, filed on Feb. 9, 2015.

(30) Foreign Application Priority Data

Mar. 13, 2014 (JP) .................. 2014-050175

(51) Int. Cl.
*G06F 3/01* (2006.01)
*G06F 3/041* (2006.01)

(52) U.S. Cl.
CPC ............ *G06F 3/0416* (2013.01); *G06F 3/016* (2013.01); *G06F 2203/014* (2013.01)

(58) Field of Classification Search
CPC ... G06F 2203/014; G06F 3/016; G06F 3/0416
See application file for complete search history.

(56) References Cited

U.S. PATENT DOCUMENTS 8,325,144 B1    12/2012   Tierling et al.
2002/0177419 A1*   11/2002   Hwang .................. H04R 11/00
                                                                  455/575.1

(Continued)

FOREIGN PATENT DOCUMENTS

JP   2006-65507    3/2006
JP   2011-501296   1/2011

(Continued)

OTHER PUBLICATIONS

International Search Report dated Mar. 10, 2015 in corresponding International Application No. PCT/JP2015/000583.

*Primary Examiner* — Ram Mistry
(74) *Attorney, Agent, or Firm* — Wenderoth, Lind & Ponack, L.L.P.

(57) ABSTRACT

An electronic device capable of presenting appropriate tactile feeling in various use situations is provided. The electronic device according to one exemplary embodiment includes: a touch panel on which a user touches; touch detector that detects the touch of the user on the touch panel; vibrator that vibrates the touch panel; driver that drives the vibrator with a first drive signal within a first frequency band and a second drive signal within a second frequency band higher than the first frequency band; vibration detector that detects a vibration of the touch panel that vibrates due to a drive with the second drive signal and outputs a detection signal; and drive frequency determinator that determines a frequency of the first drive signal based on the detection signal.

11 Claims, 8 Drawing Sheets

(56) References Cited

U.S. PATENT DOCUMENTS

| | | |
|---|---|---|
| 2009/0243997 A1* | 10/2009 | Tierling .................. G06F 3/016 345/156 |
| 2011/0075835 A1 | 3/2011 | Hill |
| 2011/0077055 A1 | 3/2011 | Pakula et al. |
| 2011/0134082 A1* | 6/2011 | Mitsuhashi ........... G06F 1/1684 345/177 |
| 2011/0248916 A1* | 10/2011 | Griffin .................... G06F 3/016 345/157 |
| 2012/0194463 A1 | 8/2012 | Tierling et al. |
| 2013/0300549 A1 | 11/2013 | Hill |
| 2013/0335217 A1 | 12/2013 | Pakula et al. |
| 2015/0061848 A1 | 3/2015 | Hill |
| 2015/0109121 A1 | 4/2015 | Pakula et al. |

FOREIGN PATENT DOCUMENTS

| | | |
|---|---|---|
| JP | 2011-522448 | 7/2011 |
| JP | 2013-507059 | 2/2013 |
| WO | 2009/051976 | 4/2009 |
| WO | 2009/120926 | 10/2009 |
| WO | 2011/041535 | 4/2011 |
| WO | 2013/073321 | 5/2013 |

\* cited by examiner

ELECTRONIC DEVICE THAT PRESENTS TACTILE FEELING TO AN OPERATION OF A USER

BACKGROUND

1. Field of the Disclosure

The present disclosure relates to an electronic device that presents tactile feeling to an operation of a user.

2. Background Art

Public terminals including a touch panel (for example, ATM, automatic ticket vending machine, or the like) have conventionally been used. In addition, personal devices including a touch panel (for example, a tablet PC, a smart phone, or the like) have become popular.

The touch panel is an input device that detects a touch on a panel as an input. Generally, the touch panel includes a liquid crystal display or an organic EL display, etc. In this case, the touch panel is also called a touch display or a touch screen. For example, the touch panel detects a touch of a user on a GUI (Graphical User Interface) object (for example, a button) displayed on a display region.

A user interface using such a touch panel has an advantage that flexibility in arrangement of the GUI object is high. However, in the user interface using a touch panel, feedback of feeling when a button is pressed is small as compared with a user interface using a conventional mechanical button. Accordingly, there is a problem that, when a user touches a touch panel, it is difficult to recognize whether the touch is detected correctly. In order to solve this problem, a method for vibrating a touch panel to present tactile feeling to the touch is proposed (for example, Japanese Translation of PCT Publication 2011-501296 (Patent Literature 1)).

Japanese Translation of PCT Publication 2013-507059 (Patent Literature 2) discloses a technique for inhibiting variations in magnitude of vibration of a touch panel caused by variations in a resonance frequency during manufacturing. In this technique, after manufacturing, the touch panel is driven at a frequency in a vicinity of a frequency at which the touch panel is to be vibrated to search for the resonance frequency.

In addition, in a case where a device including a touch panel, for example a mobile terminal and the like, is not a stationary apparatus, the device including a touch panel is used in various supported states.

SUMMARY

The present disclosure provides an electronic device that can present appropriate tactile feeling to a user in various use situations.

An electronic device according to one exemplary embodiment of the present disclosure includes: a panel on which a user touches; a touch detector configured to detect the touch of the user on the panel; a vibrator configured to vibrate the panel; a driver configured to drive the vibrator with a first drive signal within a first frequency band, and a second drive signal within a second frequency band higher than the first frequency band; a vibration detector configured to detect vibration of the panel that vibrates due to a drive with the second drive signal and to output a detection signal; and a drive frequency determinator configured to determine a frequency of the first drive signal based on the detection signal.

A computer program according to one exemplary embodiment of the present disclosure is a computer program for causing an electronic device to execute a vibration operation, and includes the steps of: detecting a touch of a user on a panel; driving the panel with a second drive signal within a second frequency band higher than a first frequency band; detecting vibration of the panel that vibrates due to a drive with the second drive signal; and determining a frequency within the first frequency band based on the detection signal and driving the panel with a first drive signal having the determined frequency.

An apparatus according to one exemplary embodiment of the present disclosure includes: a panel configured to receive a touch input; and a processor configured to control vibration of the panel by driving a vibrator with a first drive signal within a first frequency band, and a second drive signal within a second frequency band higher than the first frequency band. This processor detects vibration of the panel driven with the second drive signal, and determines a frequency of the first drive signal based on the detected vibration of the panel.

DETAILED DESCRIPTION

An exemplary embodiment will be described in detail below with reference to the drawings as needed. However, a description more detailed than necessary may be omitted. For example, a detailed description of an already well-known item and a repeated description of substantially identical components may be omitted. This is for avoiding the following description from becoming unnecessarily redundant and for making the description easier for a person skilled in the art to understand.

It is to be noted that the present inventors provide the accompanying drawings and the following description in order for a person skilled in the art to fully understand the present disclosure, and do not intend to limit the subject described in the appended claims.

Exemplary Embodiment

In a case where a touch panel is provided in a mobile terminal and the like, a user may support and use the mobile terminal in various states. For example, the user may place the mobile terminal on a desk, or may support a back of the mobile terminal with a palm, or may support the mobile terminal in a manner of gripping both sides of the mobile terminal with both hands.

The present inventors have confirmed that a resonance frequency of an enclosure and panel of the mobile terminal changes depending on the supported state of the mobile terminal. Therefore, the inventors have found out that, in a case of driving the enclosure and panel with an identical frequency, depending on the supported state of the mobile terminal, vibration may become weak, and appropriate tactile feeling may not be presented to the user.

In addition, even in a case where a device including a touch panel is a stationary type, vibration may become weak and appropriate tactile feeling may not be presented to the user, because ambient environmental temperatures change or characteristics of members of the device change during a long-term use, etc.

According to one exemplary embodiment of the present disclosure, an electronic device capable of giving appropriate tactile feeling to a user regardless of a supporting method can be provided.

Note that, in the technique disclosed in PTL 2 described above, since time is needed to transmit a drive signal for sweeping a vicinity of a frequency for vibrating the touch panel, search for the resonance frequency cannot be performed after the user touches, as in the present exemplary embodiment.

Hereinafter, the electronic device according to the exemplary embodiment will be described.

[1-1. Configuration of the Electronic Device]

Figure 1:
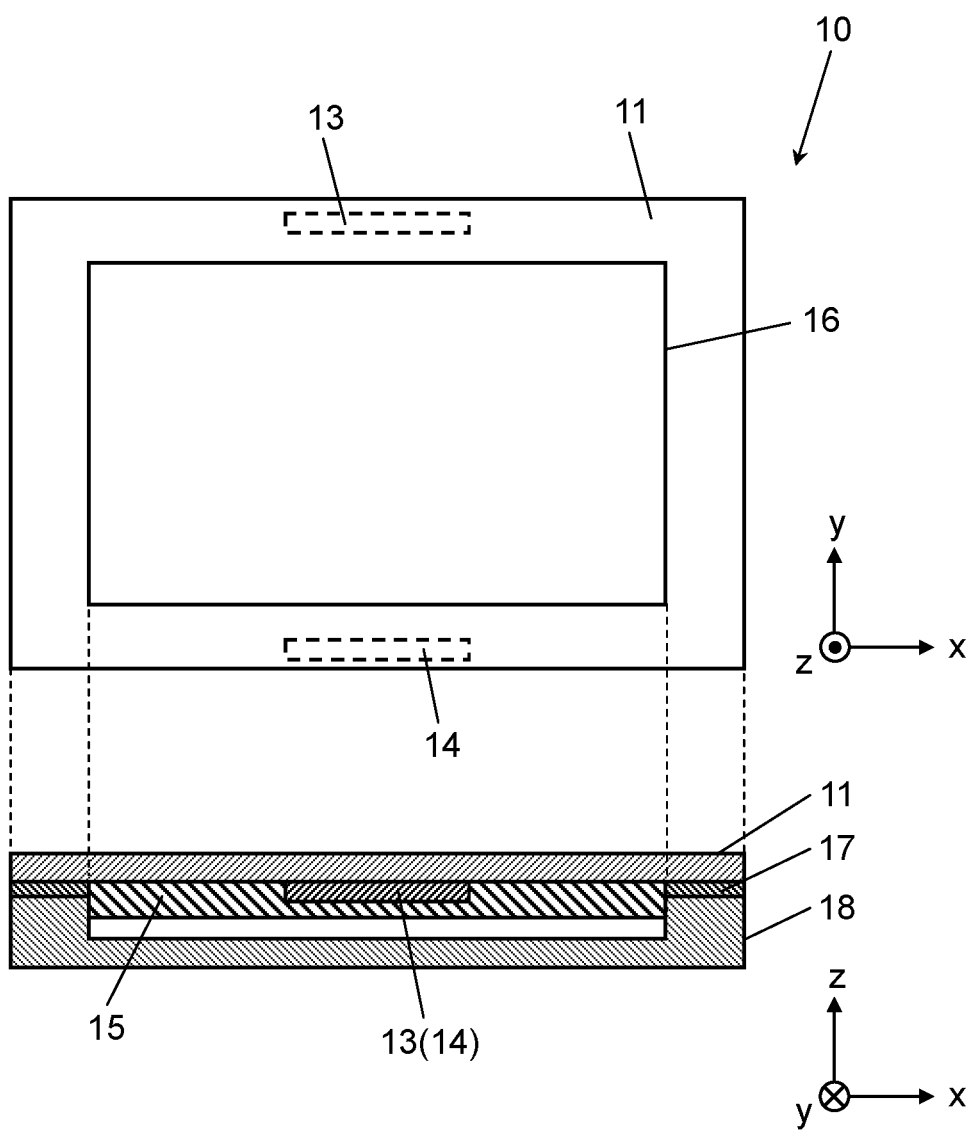
FIG. 1 is a two-view diagram illustrating a top view and a sectional view along a vibrator of an electronic device according to an exemplary embodiment.

FIG. 1 is a two-way diagram illustrating a top view and a sectional view along vibrator 13 of electronic device 10 according to the exemplary embodiment.

Figure 2:
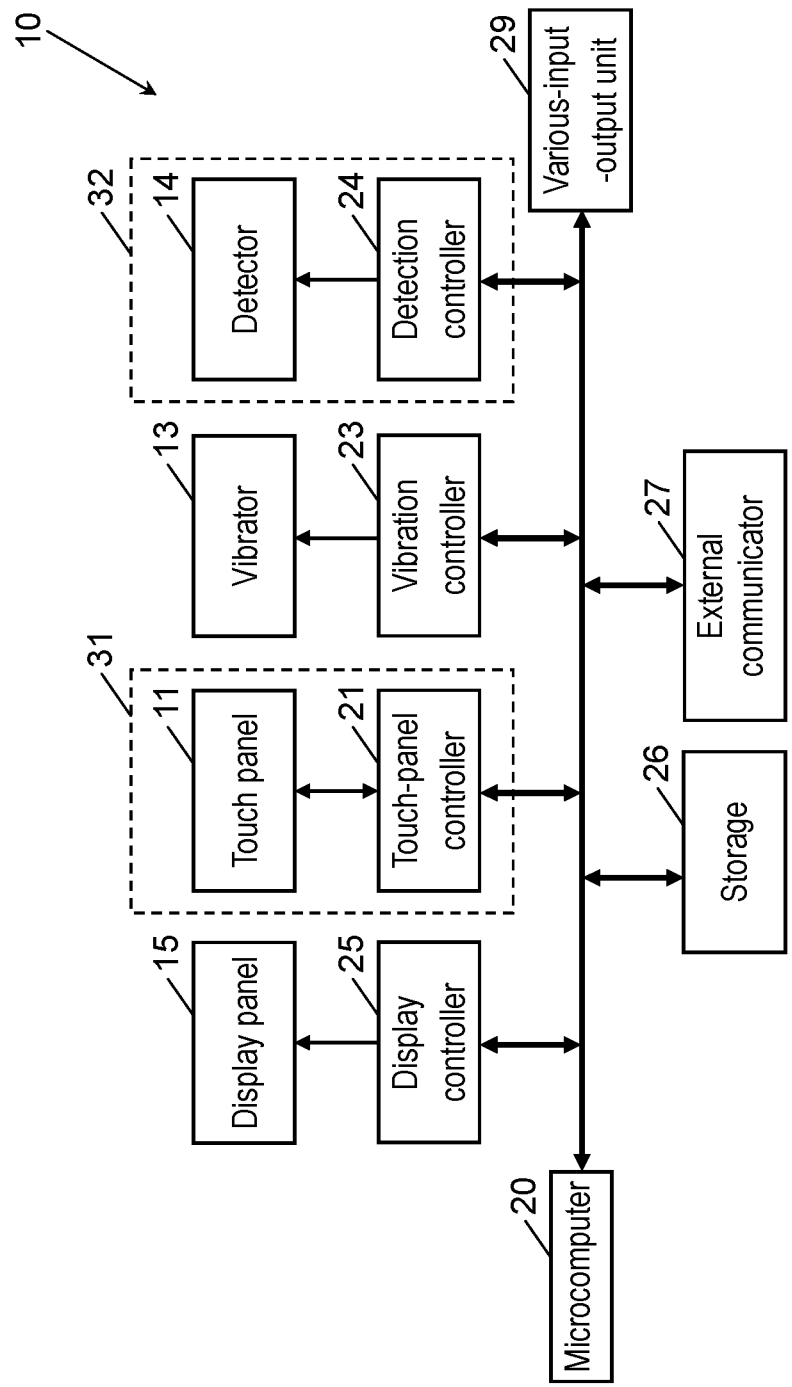
FIG. 2 is a block diagram illustrating components of the electronic device according to the exemplary embodiment.

FIG. 2 is a block diagram illustrating components of electronic device 10 according to the exemplary embodiment.

As illustrated in FIG. 1, electronic device 10 includes touch panel 11, vibrator 13, detector 14, display panel 15, spacer 17, and enclosure 18.

Touch panel 11 is disposed to cover display region 16 of display panel 15. In touch panel 11, for example, a touch position is detected by detection of change in capacitance by a touch operation of a user. Note that, in this example, touch panel 11 is configured to cover an entire surface of display region 16 of display panel 15. However, the present disclosure is not limited to this example, and touch panel 11 may be configured to cover at least part of display region 16.

Touch panel 11 is attached to enclosure 18 via spacer 17. Spacer 17 is, for example, a buffer member, such as silicon rubber, urethane rubber, and the like. Spacer 17 is fixed to touch panel 11 and enclosure 18 by using an adhesive, a double-sided tape, and the like.

Vibrator 13 is attached to a back of touch panel 11. Vibrator 13 is, for example, a piezoelectric element, and expands and contracts by application of a voltage, thereby, to generate flexural vibration. In the present exemplary embodiment, vibrator 13 vibrates touch panel 11 in accordance with a first drive signal within a first frequency band and a second drive signal within a second frequency band. The second frequency band is higher than the first frequency band, and is a frequency intangible to the user.

The vibration provided to touch panel 11 by vibrator 13 that operates based on the first drive signal propagates to the touch position of the user on touch panel 11, whereby tactile feeling is presented to the user.

Note that, in the example illustrated in FIG. 1, a number of vibrator 13 is one, but the number of vibrator 13 may be two or more.

Detector 14 is attached to the back of touch panel 11. Detector 14 is, for example, a piezoelectric element, and expands and contracts by application of a voltage, thereby, to generate flexural vibration. In the present exemplary embodiment, detector 14 detects the vibration of touch panel 11, and outputs a detection signal.

Note that, in the present exemplary embodiment, vibrator 13 and detector 14 are provided on the back of touch panel 11, but vibrator 13 and detector 14 may be affixed to one of members that constitute electronic device 10, such as display panel 15, enclosure 18, and the like. In addition, a thin-film transparent piezoelectric member may be formed on touch panel 11 by methods such as sputtering, to be used as vibrator 13 and detector 14. In addition, in a case where a cover member, etc. is above touch panel 11, vibrator 13 and detector 14 may be affixed to the cover member.

Note that, in the case where the cover member is above touch panel 11, both touch panel 11 and the cover member are called a panel member that detects the touch position. In addition, vibrator 13 is not limited to the piezoelectric element, and for example, may be a vibrating motor. In addition, detector 14 may be an acceleration sensor, etc. Detector 14 may be an electromechanical transducer that transduces mechanical displacement into an electric signal.

As illustrated in FIG. 2, electronic device 10 further includes display controller 25 that controls display of display panel 15, touch-panel controller 21 that performs control of touch position detection of touch panel 11, vibration controller 23 that controls vibration of vibrator 13, and detection controller 24 that controls detection of vibration by detector 14 and outputs the detection signal. Touch panel 11 and touch-panel controller 21 constitute touch detector 31 that detects the touch of the user on touch panel 11. In addition, detector 14 and detection controller 24 constitute vibration detector 32 that detects the vibration of touch panel 11 that vibrates due to a drive with the second drive signal, and outputs the detection signal.

In addition, electronic device 10 further includes microcomputer 20, storage 26, external communicator 27 that performs communication with outside, and various-input-output unit 29 that performs various input and output.

Microcomputer 20 controls operations of overall electronic device 10. Microcomputer 20 performs control of operations such as detection, determination, and the like of various pieces of information, and operations of respective components.

Storage 26 is, for example, a hard disk or a semiconductor memory. Storage 26 stores various programs and various pieces of data.

External communicator 27 uses, for example, wireless LAN, such as Wi-Fi (registered trademark) or the like, and is connected in a state where interconnectivity between a plurality of electronic devices is certified. The connection between electronic devices may be methods such as a method for connection via external communication apparatuses, such as an access point or the like, or P2P (wireless ad hoc network) connection that is a method for direct connection without using external telecommunications apparatuses.

On display panel 15, an object for receiving input from the user is displayed, such as a character, a number, an icon, a keyboard, and the like. For example, when a keyboard is displayed on display panel 15, the user can perform character input, etc. by performing a touch operation at an arbitrary position of the keyboard. As display panel 15, for example, known display panels can be used, such as a liquid crystal method, an organic EL method, an electronic paper method, a plasma method, and the like.

Display controller 25 controls contents to be displayed on display panel 15 based on a control signal generated by microcomputer 20.

Note that, display panel 15 does not necessarily need to be installed in electronic device 10, and electronic device 10 may have a configuration that includes neither display panel 15 nor display controller 25.

Touch panel 11 outputs a signal corresponding to the touch position of the user to touch-panel controller 21.

Touch-panel controller 21 detects timing and touch position (such as coordinates and the like) of the touch of the user. Touch-panel controller 21 functions as a detector that detects the touch position of the user. Touch-panel controller 21 outputs information on the touch position of the user to microcomputer 20, vibration controller 23, and the like.

As touch panel 11, for example, a touch panel of an electrostatic method, a resistor film method, an optical method, an ultrasonic method, an electromagnetic method, and the like can be used.

In addition, although touch panel 11 and display panel 15 are separate components in this example, touch panel 11 and display panel 15 may be integrally formed. Touch panel 11 and display panel 15 may employ, for example, methods such as an in-cell type touch panel that integrates a touch-panel function inside a liquid crystal panel, an on-cell type touch panel that integrates the touch-panel function on a surface of the liquid crystal panel, and the like.

In addition to the touch position of the user, touch-panel controller 21 may acquire information that indicates a contact area and pressing force at each touch position, etc. as touch information. The pressing force can be easily acquired, for example, when a touch panel of a pressure-sensitive method is used. In addition, the pressing force may be acquired by using a sensor such as a load cell and the like.

[1-2. Operations of the Electronic Device]

Next, a method for vibrating touch panel 11 in electronic device 10 according to the present exemplary embodiment will be described in detail.

Figure 3A:
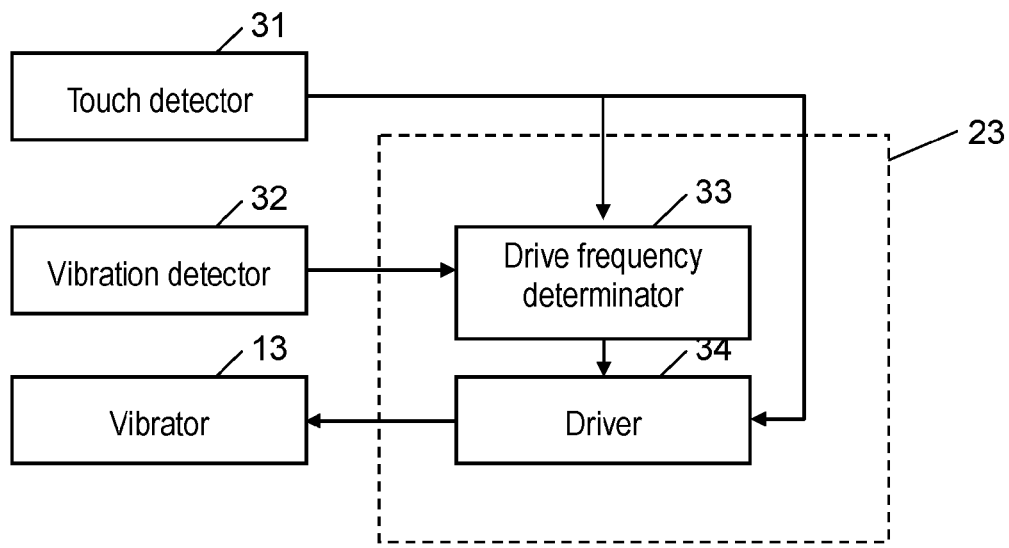
FIG. 3A is a block diagram illustrating a vibration controller according to the exemplary embodiment.
Figure 3B:
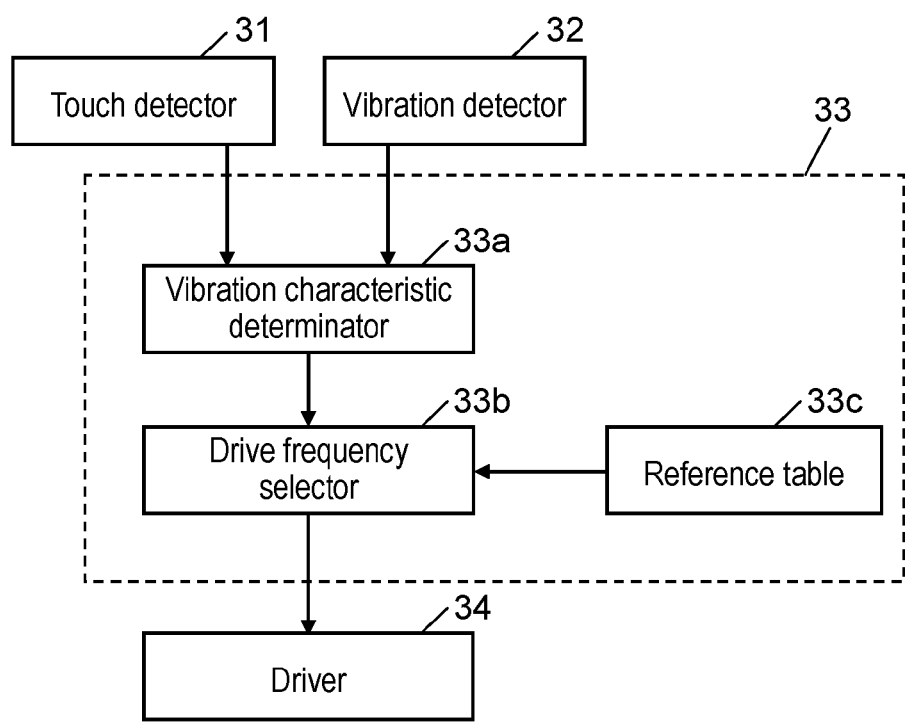
FIG. 3B is a block diagram illustrating a drive frequency determinator according to the exemplary embodiment.

FIG. 3A is a block diagram illustrating vibration controller 23 according to the exemplary embodiment. FIG. 3B is a block diagram illustrating drive frequency determinator 33 according to the exemplary embodiment.

Figure 4:
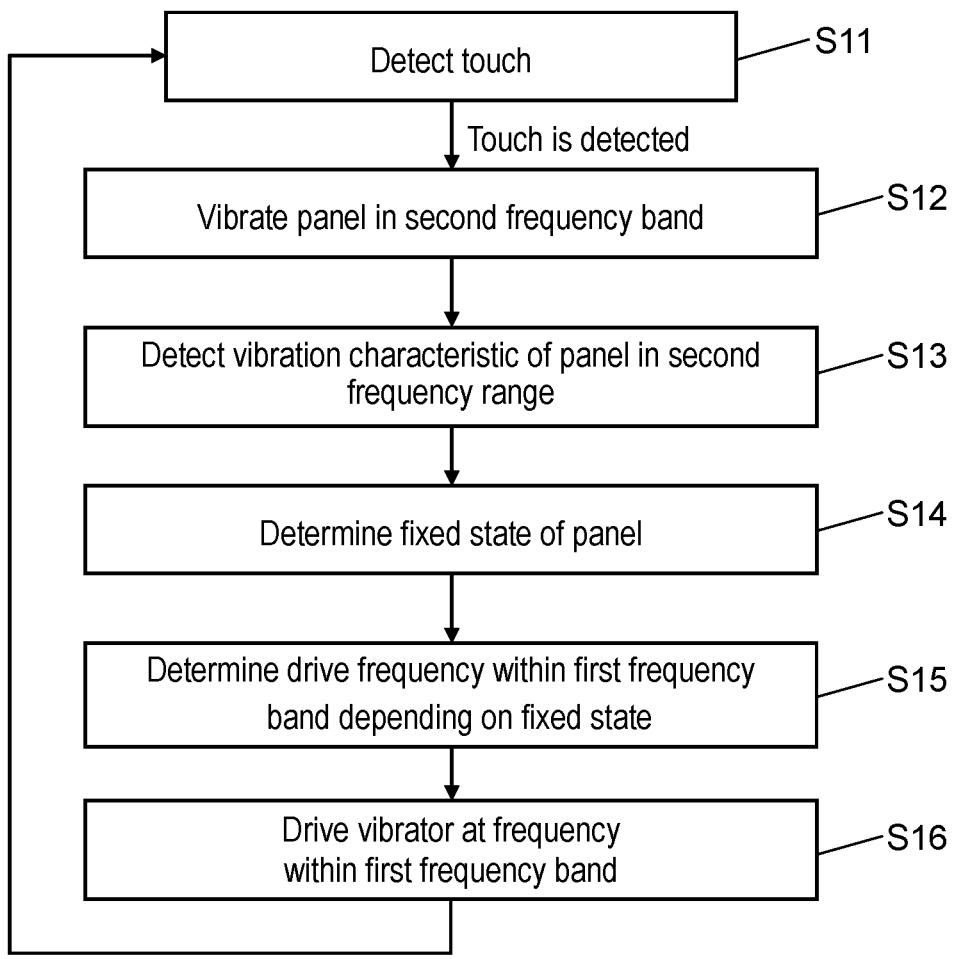
FIG. 4 is a flow chart illustrating an operation of the electronic device according to the exemplary embodiment.

FIG. 4 is a flow chart illustrating an operation of electronic device 10 according to the exemplary embodiment.

As illustrated in FIG. 3A, vibration controller 23 includes drive frequency determinator 33 and driver 34. In addition, as illustrated in FIG. 3B, drive frequency determinator 33 includes vibration characteristic determinator 33a, drive frequency selector 33b, and reference table 33c. These components of drive frequency determinator 33 are stored, for example, in storage 26, and are implemented by microcomputer 20 executing software that specifies a procedure to be described below.

When the user touches touch panel 11 of electronic device 10, touch detector 31 including touch panel 11 detects the touch by the user. Then, touch detector 31 outputs information regarding the touch to drive frequency determinator 33 and driver 34 (step S11).

Based on this information regarding the touch, driver 34 generates the second drive signal for driving vibrator 13 in order to generate vibration in touch panel 11. As described above, this second drive signal has a frequency of the second frequency band. Even if the user touches an object that vibrates at a frequency within the second frequency band, the user fails to perceive the vibration. That is, the second frequency band is a frequency at which the user fails to have tactile feeling. More specifically, the second drive signal is a variable frequency signal that sweeps the second frequency band. For example, the second frequency band is set in a range between 15 kHz and 25 kHz inclusive, and the second drive signal is a drive signal configured so that the frequency of the vibration that occurs on touch panel 11 may increase or decrease with time in the range from 15 kHz to 25 kHz. Since the frequency of the second frequency band is relatively high, time needed to change the frequency continuously from 15 kHz to 25 kHz is relatively short. For example, a length of a period of occurrence of the second drive signal is 20 msec. Accordingly touch panel 11 vibrates with the second drive signal that changes the frequency within the second frequency band (step S12).

Vibration detector 32 including detector 14 detects the vibration of touch panel 11 that vibrates due to a drive with the second drive signal. Then, vibration detector 32 outputs the detection signal to drive frequency determinator 33 (step S13).

The resonance frequency of touch panel 11 changes depending on a state in which electronic device 10 is supported. This also changes a frequency characteristic of the vibration of touch panel 11 driven with the second drive signal.

Figure 5A:
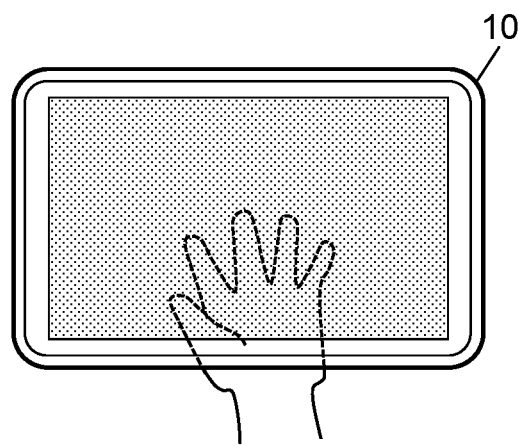
FIG. 5A is a diagram illustrating an example of a supported state of the electronic device according to the exemplary embodiment.

FIG. 5A is a diagram illustrating an example of the supported state of electronic device 10 according to the exemplary embodiment.

Figure 5B:
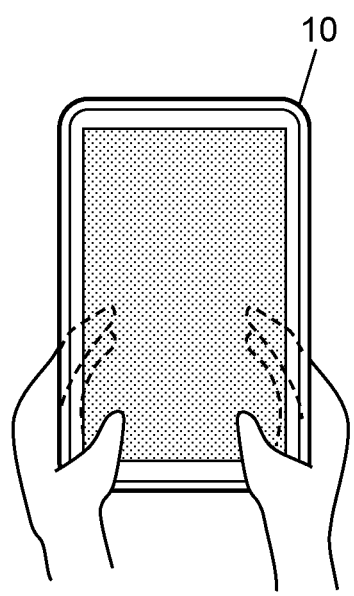
FIG. 5B is a diagram illustrating another example of the supported state of the electronic device according to the exemplary embodiment.

FIG. 5B is a diagram illustrating another example of the supported state of electronic device 10 according to the exemplary embodiment.

Figure 6A:
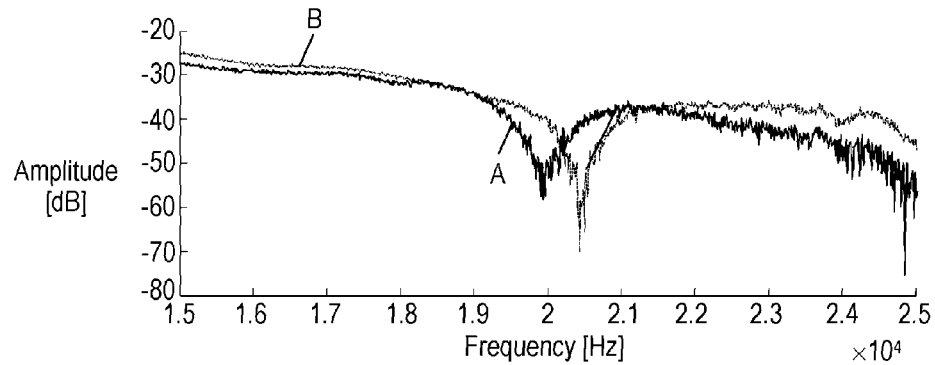
FIG. 6A is a diagram illustrating a frequency characteristic in a case of vibrating a touch panel according to the exemplary embodiment with a second drive signal.

FIG. 6A is a diagram illustrating the frequency characteristic in a case of vibrating touch panel 11 according to the exemplary embodiment with the second drive signal.

Figure 6B:
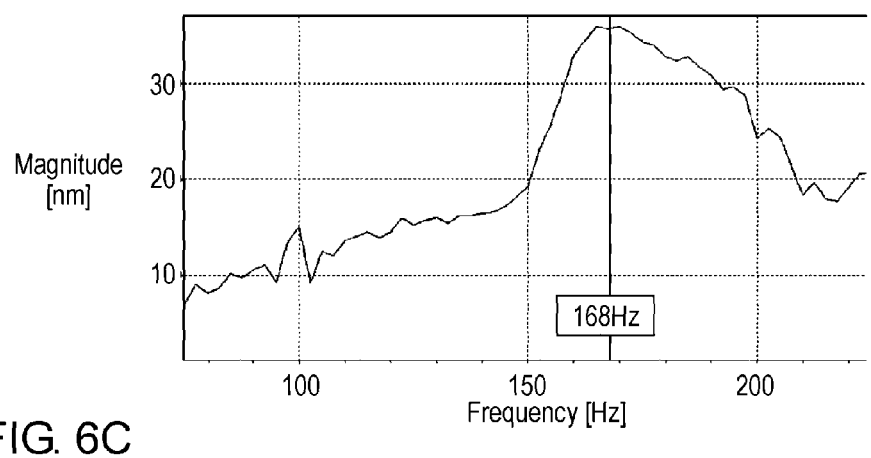
FIG. 6B is a diagram illustrating a vibration frequency characteristic of the electronic device according to the exemplary embodiment in a vicinity of a resonance frequency in the supported state of FIG. 5A.

FIG. 6B is a diagram illustrating a vibration frequency characteristic of electronic device 10 according to the exemplary embodiment in a vicinity of the resonance frequency in the supported state of FIG. 5A.

Figure 6C:
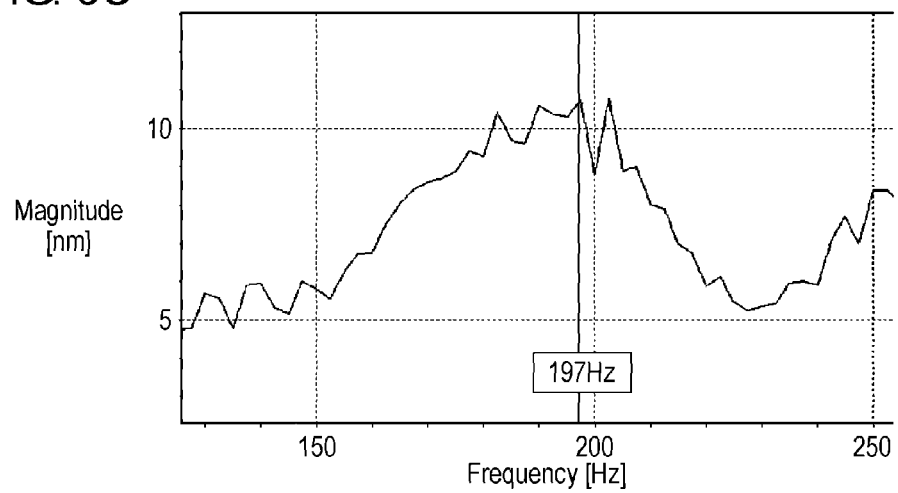
FIG. 6C is a diagram illustrating the vibration frequency characteristic of the electronic device according to the exemplary embodiment in the vicinity of the resonance frequency in the supported state of FIG. 5B.

FIG. 6C is a diagram illustrating the vibration frequency characteristic of electronic device 10 according to the exemplary embodiment in the vicinity of the resonance frequency in the supported state of FIG. 5B.

For example, as illustrated in FIG. 5A, a case where the user supports a back of electronic device 10 with a palm, and as illustrated in FIG. 5B, a case where the user supports electronic device 10 in a manner of gripping both sides of electronic device 10 with both hands are considered.

FIG. 6A illustrates the detection signal generated by vibration detector 32 that detects the vibration of touch panel 11 driven with the second drive signal, in electronic device 10 supported by the user in these two state. In FIG. 6A, a horizontal axis represents a frequency and a vertical axis represents amplitude. In FIG. 6A, waveform A is the detection signal in the supported state illustrated in FIG. 5A, and represents a vibration characteristic of touch panel 11 from 15 kHz to 25 kHz. Meanwhile, waveform B is the detection signal in the supported state illustrated in FIG. 5B, and represents the vibration characteristic of touch panel 11 from 15 kHz to 25 kHz.

As indicated in FIG. 6A, in this frequency range, touch panel 11 has a frequency at which the vibration attenuates sharply. However, the frequency at which the vibration attenuates differs depending on the supported state. Specifically, according to the example illustrated in FIG. 6A, in the supported state illustrated in FIG. 5A, the vibration attenuates sharply near 20 kHz, whereas in the supported state illustrated in FIG. 5B, the vibration attenuates sharply near 20.5 kHz.

On receipt of information regarding the touch of the user on touch panel 11, drive frequency determinator 33 receives the detection signal from vibration detector 32. Then, based on the detection signal, drive frequency determinator 33 determines a frequency of the first drive signal for vibrating touch panel 11 at a frequency at which the user can have tactile feeling. As this frequency of the first drive signal, a frequency for vibrating touch panel 11 efficiently in accordance with the supported state of electronic device 10 is selected. Accordingly, vibration characteristic determinator 33a of drive frequency determinator 33 first receives the detection signal from vibration detector 32, and determines the vibration characteristic (step S14).

Vibration characteristic determinator 33a receives the detection signal from vibration detector 32, and measures the frequency characteristic of the detection signal in the second frequency band. Specifically, vibration characteristic determinator 33a analyzes a frequency characteristic pattern according to the detection signal. Vibration characteristic determinator 33a calculates an inclination of the detection signal, a frequency at which amplitude becomes a minimum value, a feature vector made of a set of amplitude with respect to discrete frequencies that represent the frequency characteristic in the second frequency band, and the like.

In order to determine each supported state from the feature vector that represents the frequency characteristic pattern, for example, SVM (Support Vector Machine) of a machine learning method, etc. can be used. The feature vector is acquired for each supported state by vibration detector 32 measuring the vibration in a case where a plurality of test subjects support electric device 10 a plurality of times previously. The plurality of acquired feature vectors are used to cause SVM to learn each supported state previously.

When the user touches touch panel 11, drive frequency selector 33b determines the supported state by SVM by considering as an input the feature vectors obtained from the vibration characteristic when touch panel 11 is vibrated with the second drive signal. This procedure is obvious to a person skilled in the art. The feature vectors may be, for example, about from 200 dimensions to 4000 dimensions in the frequency range of from 15 kHz to 25 kHz.

In addition, in a case where the frequency characteristic by the detection signal illustrated in FIG. 6A is obtained, drive frequency selector 33b may measure the frequency at which the vibration attenuates.

As illustrated in Table 1, drive frequency determinator 33 previously stores reference table 33c that indicates a correspondence between the frequency characteristic pattern detected in each supported state and the resonance frequency in the supported state. The resonance frequency in each supported state is previously calculated by vibration analysis of touch panel 11 and actual measurement, and is a value within the first frequency band that is a frequency band in which the user can have tactile feeling. Although Table 1 illustrates two supported states, reference table 33c may include, for each of three or more supported states, the correspondence between the frequency characteristic pattern and the resonance frequency in the supported state.

The frequency characteristic pattern corresponding to a certain drive frequency is not limited to one, but may be two or more. For example, in a case where a frequency at which amplitude becomes a minimum value is to be calculated as the frequency characteristic pattern, drive frequencies different for each predetermined range may correspond to the frequency at which amplitude becomes a minimum value.

For example, FIG. 6B and FIG. 6C illustrate the vibration characteristics of the touch panel in the first frequency band that is a frequency band in which the user can have tactile feeling, in the supported states illustrated in FIG. 5A and FIG. 5B, respectively. In each of FIG. 6B and FIG. 6C, a horizontal axis represents the frequency and a vertical axis represents the magnitude of vibration. As shown in FIG. 6B and FIG. 6C, amplitude is maximum at 168 Hz and 197 Hz, and that these frequencies are the resonance frequencies of touch panel 11 in the supported states illustrated in FIG. 5A and FIG. 5B, respectively.

TABLE 1

| Supported state | Frequency characteristic pattern determined by measurement (frequency at which vibration attenuates) | Drive frequency |
| --- | --- | --- |
| Support a back with a palm | 20 kHz | 168 Hz |
| Support both sides | 20.5 kHz | 197 Hz |

Drive frequency selector 33b uses the reference table as illustrated in Table 1 to determine the supported state of electronic device 10 from the frequency characteristic pattern determined by measurement. Then, drive frequency selector 33b determines the drive frequency corresponding to the determined supported state (step S15).

The drive frequency determined in step S15 is output to driver 34.

Driver 34 generates the first drive signal that has the drive frequency determined in step S15, and drives vibrator 13 with the first drive signal (step S16).

This causes touch panel 11 to vibrate at the frequency at which the user can have tactile feeling. In addition, in electronic device 10, the frequency dependent on the supported state of the user is selected. Accordingly, electronic device 10 can select a frequency at which the vibration becomes large, such as selecting the resonance frequency depending on the supported state. Accordingly, electronic device 10 can enlarge the vibration of touch panel 11 sufficiently regardless of the supported state by the user. Therefore, the user can have tactile feeling of the vibration of touch panel 11 having appropriate magnitude, without feeling a difference in the magnitude of the vibration depending on a supported mode.

Figure 7:
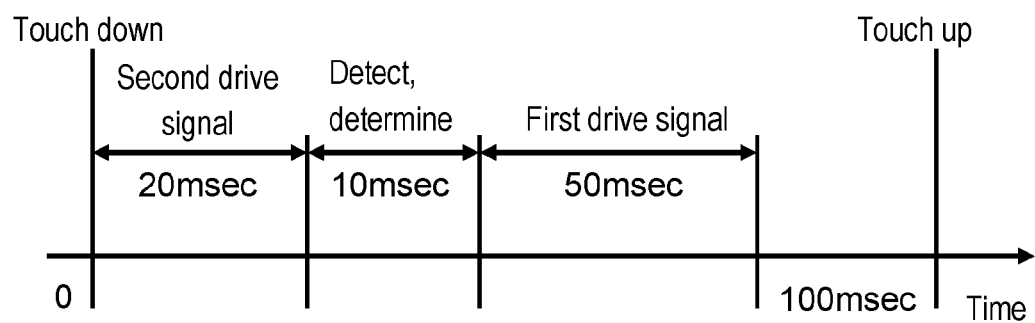
FIG. 7 is a diagram illustrating generation timing of a first drive signal and the second drive signal, and timing of a touch of a user on the touch panel.

FIG. 7 is a diagram illustrating generation timing of the first drive signal and the second drive signal, and timing of the touch of the user on touch panel 11. FIG. 7 illustrates a relationship between the generation timing of the first drive signal and the second drive signal, and the timing of the touch on touch panel 11 by the user, in a case of vibrating touch panel 11 by the above procedure, In the present exemplary embodiment, the second drive signal used for measurement of the supported state of electronic device 10 has a frequency higher than a frequency of the first drive signal at which the user can have tactile feeling, the first drive signal actually driving touch panel 11 and presenting tactile feeling to the user. Specifically, the second drive signal has a frequency of 15 kHz or higher. For example, as the second drive signal, a signal that sweeps the frequency linearly from 15 kHz to 25 kHz during 20 msec after touchdown can be used. The vibration characteristic of FIG. 6A is obtained by this drive signal.

Even if 10 msec is needed for drive frequency determinator 33 to subsequently detect the vibration driven with the second drive signal and to determine the frequency of the first drive signal based on the detection result, in about 30 msec after the user touches touch panel 11, vibration controller 23 can determine the supported state of electronic device 10, and can start driving touch panel 11 at a frequency which is suitable for the supported state and in which the user can have tactile feeling. In addition, since the second drive signal has the frequency at which the user cannot have tactile feeling, the user cannot have tactile feeling of touch panel 11 vibrating during this period. Therefore, in 30 msec after touching touch panel 11, the user can have tactile feeling of touch panel 11 vibrating with large amplitude, without feeling an unnecessary vibration.

In addition, since the above-described operation of driver 34 is completed relatively in a short time, it is possible to perform this operation every time the user touches touch panel 11, as illustrated in FIG. 7. Accordingly, even in a case where electronic device 10 is a mobile terminal, etc. and the user changes the supported state of electronic device 10 frequently, the user can have tactile feeling of the vibration of appropriate magnitude of touch panel 11, regardless of the supported state.

In the present exemplary embodiment, every time the user touches touch panel 11, driver 34 performs the above-described operation to determine the frequency of the first drive signal. However, driver 34 may perform the above-described operation only when the supported state of electronic device 10 changes. For example, electronic device 10 may include an element that detects acceleration acting on electronic device 10, such as an acceleration sensor and a gyroscope sensor. Then, in a case where determination can be made that the supported state of electronic device 10 has changed, based on the detection signal from the acceleration sensor or the gyroscope sensor, driver 34 performs the above-described operation. Electronic device 10 may be configured in this way.

Figure 8:
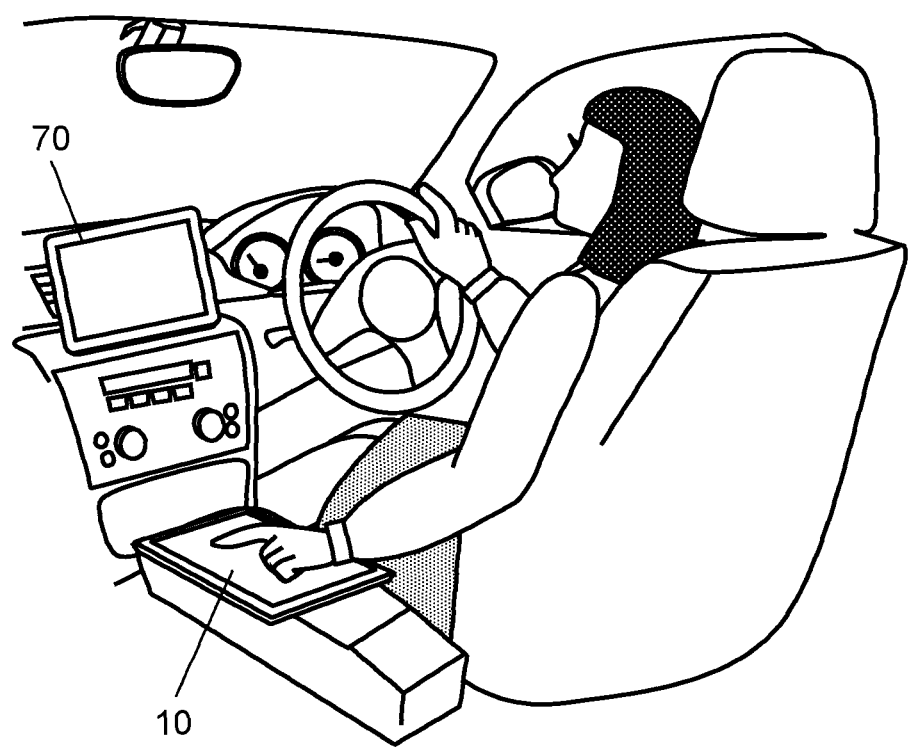
FIG. 8 is a diagram illustrating the electronic device installed in an automobile according to the exemplary embodiment.

In addition, even in a case where the user does not carry electronic device 10, such as where electronic device 10 is incorporated in a stationary apparatus, magnitude of the vibration of touch panel 11 may change because of variations in the resonance frequency of touch panel 11 due to deterioration of electronic device 10 with age or change in operating environmental temperatures. The present exemplary embodiment may be used to inhibit this change. For example, electronic device 10 may be a touch input apparatus installed in an automobile. FIG. 8 is a diagram illustrating electronic device 10 according to the exemplary embodiment installed in an automobile. In an example illustrated in FIG. 8, electronic device 10 is installed in a so-called center console portion between a driver's seat and a passenger seat.

The user can use electronic device 10 to operate onboard equipment, such as car navigation apparatus 70, a car audio, an air conditioner, and the like.

Car navigation apparatus 70 is installed in the automobile. Electronic device 10 is communicatively connected to car navigation apparatus 70. Electronic device 10 receives a touch operation by a finger of the user. The user can use electronic device 10 to operate car navigation apparatus 70 and to cause car navigation apparatus 70 to perform navigation to a destination. In this way, even in a form in which electronic device 10 is mounted in the automobile, electronic device 10 is capable of providing the user with appropriate feeling of operation, by determining the frequency of the first drive signal depending on change in the resonance frequency of touch panel 11, and by vibrating touch panel 11 in appropriate magnitude.

Note that, in the example illustrated in FIG. 8, electronic device 10 and car navigation apparatus 70 are separate bodies, but electronic device 10 and car navigation apparatus 70 may be integrated to form one car navigation apparatus.

Note that, in the present exemplary embodiment, electronic device 10 includes both vibrator 13 and detector 14, but may include one piezoelectric element that functions as both vibrator 13 and detector 14. In this case, electronic device 10 may perform transmission of the second drive signal intermittently in a plurality of times, and may detect the vibration of touch panel 11 while suspending transmission of the second drive signal. In addition, in a case where electronic device 10 includes both vibrator 13 and detector 14, after detector 14 detects the vibration of touch panel 11, electronic device 10 may apply the first drive signal to detector 14 and use detector 14 as vibrator 13.

Other Exemplary Embodiments

As described above, the above-described exemplary embodiment has been described by way of example of a technique to be disclosed in the present application. However, the technique in the present disclosure is not limited to these, and changes, replacements, additions, omissions, etc. may be made to the exemplary embodiment as needed. In addition, it is also possible to combine various components described in the above exemplary embodiment as needed to make a new exemplary embodiment.

Hereinafter, other exemplary embodiments will be illustrated.

In the above-described exemplary embodiment, description is given mainly using a tablet type information terminal device as an example of the electronic device, but the electronic device is not limited to this example. The electronic device may be an electronic device that includes a touch panel, for example, a cellular phone, a PDA, a game machine, a car navigation system, ATM, etc.

In addition, in the above-described exemplary embodiment, the electronic device includes a display panel, but the electronic device does not need to include the display panel. The electronic device may be, for example, an electronic device such as a touch pad.

In the above-described exemplary embodiment, description is given by illustrating an example of the touch panel as an operation unit, but the operation unit is not limited to this example. The operation unit may be, for example, a pointing device like a mouse. In this case, vibrator 13 is provided in the mouse and vibrates the mouse.

In the above-described exemplary embodiment, an example of affixing the vibrator on the panel is illustrated, but the vibrator may be affixed to an enclosure, a frame, etc.

In the above-described exemplary embodiment, the vibrator is a piezoelectric element, but the vibration may be propagated by another method, such as an actuator by electrostatic force, VCM, a vibrating motor, and the like. In addition, a thin-film transparent piezoelectric member may be formed on the panel by a method such as sputtering and the like, to be used as the vibrator.

In addition, in the above-described exemplary embodiment, flexural vibration is illustrated as a type of vibration, but the vibration may be vibration caused by a wave of condensation and rarefaction, and a surface wave.

In the above-described exemplary embodiment, description is given with the touch panel and the display panel as separate bodies, but the touch panel and the display panel may be connected to each other by optical bonding, etc.

In the above-described exemplary embodiment, the touch panel and the display panel are separate components, but the touch panel and the display panel may be integrally formed. For example, the touch panel and the display panel may be integrally formed by methods such as an in-cell type touch panel that integrates a touch-panel function inside a liquid crystal panel, and an on-cell type touch panel that integrates the touch-panel function on a surface of the liquid crystal panel. In this case, the vibrator may be provided on a back of the display panel.

In addition, in the above-described exemplary embodiment, tactile feeling is presented to the user by occurrence of vibration, but the technique of the present disclosure is not limited to this example. In addition to vibration, tactile feeling may be presented to the user by other methods, for example, change in friction caused by static electricity, a stimulus on a skin caused by an electric current, change in a screen shape caused by a liquid, and the like. Not only presentation of tactile feeling but also screen display, sound, light, heat, etc. may be combined as needed.

In addition, the microcomputer may fulfill operations of at least one of the display controller, the touch-panel controller, and the vibration controller.

In addition, the above-described operations of the electronic device may be implemented by hardware, and may be implemented by software. A program that executes such operations may be stored in the storage, and may be stored in a built-in memory or ROM of the microcomputer. In addition, such a computer program may be installed in the electronic device from a recording medium (such as an optical disc, a semiconductor memory, and the like) in which the computer program is recorded, and may be downloaded over electric telecommunication lines, such as the Internet and the like.

[1-3. Effect, Etc.]

As described above, electronic device 10 according to one exemplary embodiment of the present disclosure includes: touch panel 11 on which a user touches; touch detector 31 configured to detect the touch of the user on touch panel 11; vibrator 13 configured to vibrate touch panel 11; driver 34 configured to drive vibrator 13 with a first drive signal within a first frequency band, and a second drive signal within a second frequency band higher than the first frequency band; vibration detector 32 configured to detect vibration of touch panel 11 that vibrates due to a drive with the second drive signal and to output a detection signal; and drive frequency determinator 33 configured to determine a frequency of the first drive signal based on the detection signal.

According to the present exemplary embodiment, by vibrating touch panel 11 with the second drive signal within the second frequency band higher than the first frequency band for vibration that provides the user with tactile feeling, the vibration characteristic of electronic device 10 in the current supported state can be detected in a shorter time, without providing tactile feeling to the user. Based on this detection result, electronic device 10 determines the frequency of the first drive signal for vibration that provides tactile feeling to the user. Accordingly, electronic device 10 can determine a frequency at which the vibration becomes large, such as selecting the resonance frequency depending on the supported state. Accordingly, electronic device 10 can enlarge the vibration of touch panel 11 sufficiently regardless of the supported state by the user. Therefore, the user can have tactile feeling of the vibration of touch panel 11 having appropriate magnitude, without feeling a difference in the magnitude of the vibration depending on the supported mode.

In addition, since this operation is completed relatively in a short time, it is possible to perform this operation every time the user touches touch panel 11. Accordingly, even in a case where electronic device 10 is a mobile terminal, etc. and the user changes the supported state of electronic device 10 frequently, the user can have tactile feeling of the vibration of appropriate magnitude of touch panel 11, regardless of the supported state.

Driver 34 may drive vibrator 13 with the second drive signal based on detection by touch detector 31, and may drive vibrator 13 with the first drive signal based on the determination by drive frequency determinator 33.

The second drive signal may be a variable frequency signal that sweeps the second frequency band.

Drive frequency determinator 33 may determine the frequency of the first drive signal from at least two frequencies different from each other based on the detection signal.

The first frequency band may be a frequency tangible to the user.

The second frequency band may be 15 kHz or higher.

Vibrator 13 may include a first piezoelectric element, and vibration detector 32 may include a second piezoelectric element.

The second piezoelectric element may function as vibrator 13, and may be driven by vibrator 13 based on the first drive signal.

Vibrator 13 and vibration detector 32 may be formed of one piezoelectric element.

A method for vibrating touch panel 11 of electronic device 10 according to one exemplary embodiment of the present disclosure includes: detecting a touch of a user on touch panel 11; driving touch panel 11 with a second drive signal within a second frequency band higher than a first frequency band; detecting vibration of touch panel 11 that vibrates due to a drive with the second drive signal; and determining a frequency within the first frequency band based on the detection signal, and driving touch panel 11 with a first drive signal having the determined frequency.

A computer program according to one exemplary embodiment of the present disclosure is a computer program for causing electronic device 10 to execute a vibration operation. This computer program includes: detecting a touch of a user on touch panel 11; driving touch panel 11 with a second drive signal within a second frequency band higher than a first frequency band; detecting vibration of touch panel 11 that vibrates due to a drive with the second drive signal; and determining a frequency within the first frequency band based on the detection signal, and driving touch panel 11 with a first drive signal having the determined frequency.

An apparatus according to one exemplary embodiment of the present disclosure includes: touch panel 11 configured to receive a touch input of a user; and a processor configured to control vibration of touch panel 11 by driving vibrator 13 with a first drive signal within a first frequency band, and a second drive signal within a second frequency band higher than the first frequency band. This processor detects vibration of touch panel 11 driven with the second drive signal, and determines a frequency of the first drive signal based on the detected vibration of touch panel 11. This apparatus may be electronic device 10, and this processor may be microcomputer 20.

Electronic device 10 according to the exemplary embodiment of the present disclosure can implement an electronic device that provides the user with tactile feeling of appropriate magnitude also in various supported states and use environments.

As described above, the exemplary embodiment has been described by way of example of the technique in the present disclosure. For this purpose, the accompanying drawings and detailed description have been provided. Therefore, the components described in the accompanying drawings and detailed description may include not only components essential for solving problems but also components unessential for solving problems, in order to illustrate the above-described technique. Therefore, it should not be acknowledged immediately that those unessential components be essential because those unessential components are described in the accompanying drawings and detailed description.

In addition, since the above-described exemplary embodiment is for illustrating the technique in the present disclosure, various changes, replacements, additions, omissions, etc. can be made within the scope of the appended claims and equivalents thereof.

The technique according to the present disclosure is particularly useful in a technical field in which tactile feeling is presented to the user's operation, and can be applied to apparatuses, for example, a mobile information terminal, a cellular phone, onboard equipment for a vehicle, a television, a digital still camera, a digital video camera, a personal computer, an electronic white board, a display for digital signage, and the like.

What is claimed is:

1. An electronic device comprising:
   a panel on which a user touches;
   a touch detector configured to detect the touch of the user on the panel;
   a vibrator configured to vibrate the panel;
   a driver configured to drive the vibrator with a first drive signal within a first frequency band, and a second drive signal within a second frequency band higher than the first frequency band, wherein the first frequency band and the second frequency band are mutually exclusive;
   a vibration detector configured to detect a vibration of the panel that vibrates due to a drive with the second drive signal and to output a detection signal; and
   a drive frequency determinator configured to determine a frequency of the first drive signal based on the detection signal.

2. The electronic device according to claim 1, wherein the driver:
   drives the vibrator with the second drive signal based on a detection by the touch detector; and
   drives the vibrator with the first drive signal based on a determination by the drive frequency determinator.

3. The electronic device according to claim 1, wherein the second drive signal is a variable frequency signal that sweeps the second frequency band.

4. The electronic device according to claim 1, wherein the drive frequency determinator determines the frequency of the first drive signal from at least two frequencies different from each other based on the detection signal.

5. The electronic device according to claim 1, wherein the first frequency band is a frequency tangible to the user.

6. The electronic device according to claim 1, wherein the second frequency band is 15 kHz or higher.

7. The electronic device according to claim 1, wherein
   the vibrator includes a first piezoelectric element, and
   the vibration detector includes a second piezoelectric element.

8. The electronic device according to claim 7, wherein the second piezoelectric element functions also as the vibrator, and is driven by the vibrator based on the first drive signal.

9. The electronic device according to claim 1, wherein the vibrator and the vibration detector are formed of one piezoelectric element.

10. A method for vibrating a panel of an electronic device, the method comprising:
    detecting a touch of a user on the panel;
    driving the panel with a second drive signal within a second frequency band higher than a first frequency band, wherein the first frequency band and the second frequency band are mutually exclusive;
    detecting vibration of the panel that vibrates due to a drive with the second drive signal; and
    determining a frequency within the first frequency band based on the detection signal, and driving the panel with a first drive signal having the determined frequency.

11. An apparatus comprising:
    a panel configured to receive a touch input; and
    a processor configured to control vibration of the panel by driving a vibrator with a first drive signal within a first frequency band and a second drive signal within a second frequency band higher than the first frequency band,
    wherein the first frequency band and the second frequency band are mutually exclusive, and
    wherein the processor detects a vibration of the panel driven with the second drive signal, and determines a frequency of the first drive signal based on the detected vibration of the panel.

* * * * *